US007564853B1

(12) United States Patent
Zhu et al.

(10) Patent No.: US 7,564,853 B1
(45) Date of Patent: Jul. 21, 2009

(54) INTER-WORKING BETWEEN UMA AND SIP SIGNALING

(75) Inventors: Peter Zhu, Cupertino, CA (US); Allan Baw, San Jose, CA (US); Mark Gallagher, Newbury (GB)

(73) Assignee: Stoke, Mountain View, CA (US)

( * ) Notice: Subject to any disclaimer, the term of this patent is extended or adjusted under 35 U.S.C. 154(b) by 531 days.

(21) Appl. No.: 11/351,834

(22) Filed: Feb. 9, 2006

(51) Int. Cl.
*H04L 12/28* (2006.01)
(52) U.S. Cl. .................. 370/395.5; 370/466; 455/432.2
(58) Field of Classification Search .................. 370/466, 370/324, 331, 353–356, 337, 347, 389, 392, 370/395.5, 471, 494; 455/424, 425, 432.2, 455/439, 95; 709/227, 228, 237
See application file for complete search history.

(56) References Cited

U.S. PATENT DOCUMENTS

| | | | |
|---|---|---|---|
| 6,192,244 B1 * | 2/2001 | Abbadessa | 455/436 |
| 6,449,285 B1 * | 9/2002 | Mills | 370/466 |
| 6,741,868 B1 * | 5/2004 | Park et al. | 455/552.1 |
| 7,263,354 B2 * | 8/2007 | Naim et al. | 455/422.1 |
| 7,349,698 B2 * | 3/2008 | Gallagher et al. | 455/435.2 |
| 2005/0215245 A1 * | 9/2005 | Tian et al. | 455/422.1 |
| 2007/0002844 A1 * | 1/2007 | Ali | 370/352 |
| 2007/0147400 A1 * | 6/2007 | Hu | 370/401 |

OTHER PUBLICATIONS

UMA Architecture, Unlicensed Mobile Access (UMA); Architecture (Stage2), R1.01 (Oct. 8, 2004) Technical Specification, 2004, 80 pages.

* cited by examiner

*Primary Examiner*—Hassan Kizou
*Assistant Examiner*—Benjamin Elliott
(74) *Attorney, Agent, or Firm*—Blakely, Sokoloff, Taylor & Zafman LLP

(57) ABSTRACT

A method and system for inter-working between UMA and SIP signaling are described. In one embodiment, an exemplary method includes receiving UMA messages of mobile devices, and transforming each UMA message into a format facilitating inter-working between the UMA and SIP protocols for the mobile devices.

14 Claims, 6 Drawing Sheets

INTER-WORKING BETWEEN UMA AND SIP SIGNALING

FIELD OF THE INVENTION

The present invention relates to wireless communications; more particularly, the present invention relates to inter-working between UMA and SIP signaling.

BACKGROUND OF THE INVENTION

Unlicensed Mobile Access (UMA) technology provides access to Global System for Mobile Communications (GSM) services and General Packet Radio Service (GPRS) mobile services over unlicensed spectrum technologies, including Bluetooth and 802.11. In order to promote the widespread adoption of UMA technology, a number of leading companies within the wireless industry have jointly developed a set of open specifications. In addition to developing and maintaining the initial specifications, the participating companies are actively working with the 3GPP standards organization to use the specifications as the basis for the development of a formal standard.

However, UMA has several deficiencies. For example, UMA is dependent on legacy GSM protocols, and suffers from lack of support for the Session Initiation Protocol (SIP), which enables call control for Voice over IP (VoIP) and IP Multimedia Subsystem (IMS) networks.

SUMMARY OF THE INVENTION

A method and system for inter-working between UMA and SIP signaling are described. According to one aspect, an exemplary method includes receiving UMA messages of mobile devices, and transforming each UMA message into a format facilitating inter-working between the UMA and SIP protocols for the mobile devices.

Other features of the present invention will be apparent from the accompanying drawings and from the detailed description that follows.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
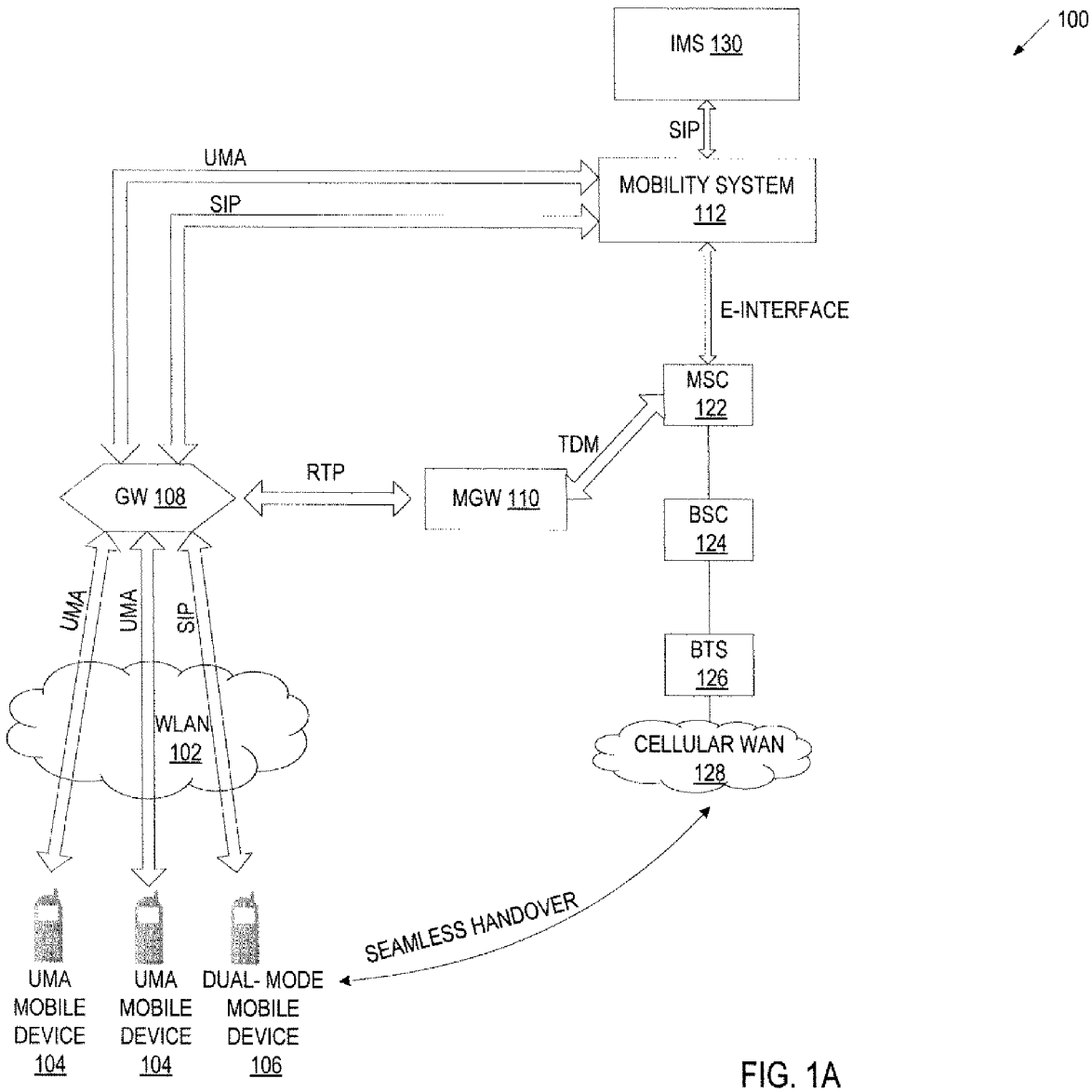
FIG. 1A is a block diagram of one embodiment of a network architecture in which embodiments of the present invention may operate.

A method and system for inter-working between UMA and SIP signaling are described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

Overview

Embodiments of the present invention facilitate inter-working between UMA (Unlicensed Mobile Access) and SIP (Session Initiation Protocol) signaling, thus allowing UMA-enabled mobile devices to receive SIP-based services.

FIG. 1A is a block diagram of one embodiment of a network architecture 100 in which embodiments of the present invention may operate. The architecture 100 facilitates convergence between a fixed network such as a WLAN 102 and a mobile network such as a cellular network (also referred to herein as a cellular WAN) 128. The cellular network 128 may be a conventional global system for mobile communications (GSM) network that provides cellular services to end-users. The WLAN 102 may include multiple local area networks known as WiFi networks or IEEE 802.11 networks.

Portable devices 104 through 106 include UMA-enabled mobile devices that use UMA for signaling. In addition, the portable devices 104 through 106 include dual-mode mobile devices 106 that use SIP for signaling when receiving services via the WLAN 102, and GSM-based signaling when receiving services via the cellular network 128. The mobile devices 104 through 106 may be wireless telephones, pagers, personal digital assistants (PDAs), and/or any other Internet-capable portable devices.

The cellular network includes a mobile switching center (MSC) 122 that provides a connection of signaling information between mobile devices and a public land mobile network (PLMN) such as a public switched telephone network (PSTN). The MSC 122 communicates with at least one base station controller (BSC) 124, which, in turn, is in contact with at least one base transceiver station (BTS) 126. BTS 126 is a radio tower that provides radio coverage to a cell for which it is responsible. The MSC 122 receives location-updating messages from the mobile devices and sends corresponding update location messages to a home location register (HLR) that maintains subscriber data.

When receiving services from the WiFi network, mobile devices 104 through 106 communicate with a gateway 108. The gateway 108 receives UMA and SIP messages and voice data from mobile device 104 through 106, passes the UMA and SIP messages to a mobility system 112, and transmits the voice data received to a media gateway (MGW) 110 using the real-time transport protocol (RTP). In one embodiment, the gateway 108 also transmits other multimedia data (e.g., video) to the MGW 110 using RTP. The MGW 110 translates the RTP data into time division multiplexing (TDM) data streams and transfers these data streams to the MSC 122.

The mobility system 112 serves as a mobility anchor point for voice, video and other multimedia data services. It is coupled to the WLAN 102 via the gateway 108 and to the cellular network 128 via the MSC 122. The mobility system 112 controls media sessions for mobile devices 104 through 106, maintains identity and location of mobile devices 104 through 106, and enables seamless handoffs between the WLAN 102 and the cellular network 128 for the mobile devices. In addition, in one embodiment, the mobility system 112 communicates with the IP multimedia subsystem (IMS) 130 to provide IMS services to the mobile devices 104 through 106. As such, the mobility system 112 can support various features including, for example, audio-video conferencing, interactive gaming, call forwarding, email, chat sessions, etc.

The mobility system 112 communicates with mobile devices 104 through 106 using SIP or UMA as a session control protocol. In particular, the mobility system 112 uses UMA to communicate with UMA mobile devices 104, while using SIP to communicate with dual mode mobile devices 106. When receiving UMA messages of mobile devices 104 from the gateway 108, the mobility system 112 converts them to facilitate inter-working between UMA and SIP signaling. In one embodiment, the mobility system 112 first determines the type of a received UMA message and then performs the conversion according to this type, as will be discussed in more detail below. Similarly, prior to forwarding messages to the UMA mobile devices 104, the mobility system 112 converts these messages into the UMA format. Hence, the mobility system 112 appears as a UMA network controller (UNC) towards the UMA mobile devices 104 while appearing as a SIP proxy towards dual-mode mobile devices 106.

In one embodiment, the mobility system 112 allows the WLAN 102 or cellular network 128 to provide service to a mobile device as long as the quality of service is likely to be acceptable. If the quality of service degrades below an acceptable level, the mobility system 112 executes a seamless handoff between the networks. In one embodiment, the mobility system 112 detects handoff triggers based on current network characteristics provided by the mobile devices 104 and 106. The characteristics may include, for example, a signal strength indicator, an error rate, a signal quality indicator, etc. In one embodiment, mobile devices 104 and 106 receiving service from the WLAN 102 send current network characteristics to the mobility system 112 in UMA and SIP messages respectively. The mobility system 112 uses data received from the mobile devices to ensure that end-users are served by the network access method that provides them with sufficient signal quality in a transparent manner.

During handoffs between the WLAN 102 and the cellular network 128, the mobility system 112 communicates with the MSC 122 via E-Interface, a signaling interface between two neighboring MSCs. Hence, the mobility system 112 appears to the MSC 122 as a neighboring MSC, allowing for handling handoffs between the WLAN 102 and the cellular network 128 as inter-MSC handoff events. In one embodiment, the mobility system 112 acts as an initiating MSC towards the MSC 122 during handoffs from the WLAN 102 to the cellular network 128, and as a target Base Station Subsystem (BSS) towards the MCS 122 during handoffs from the cellular network 128 to the WLAN 102.

In one embodiment, the signaling occurring during inter-MSC handoff events is based on GSM-MAP (management application part). BSSMAP messages relevant to handoff events are encapsulated within GSM-MAP messages for transport over E-interface between the mobility system 112 and the MSC 122. As a result, the mobility system 112 preserves existing GSM handoff procedures such as those defined by the UMA specification, except that the mobility system 112 leverages existing GSM inter-MSC handoff procedures while the UMA approach uses inter-BSC handoffs and allows for plain transport of BSSMAP messages over A-Interface.

UMA/SIP Inter-Working

Figure 1B:
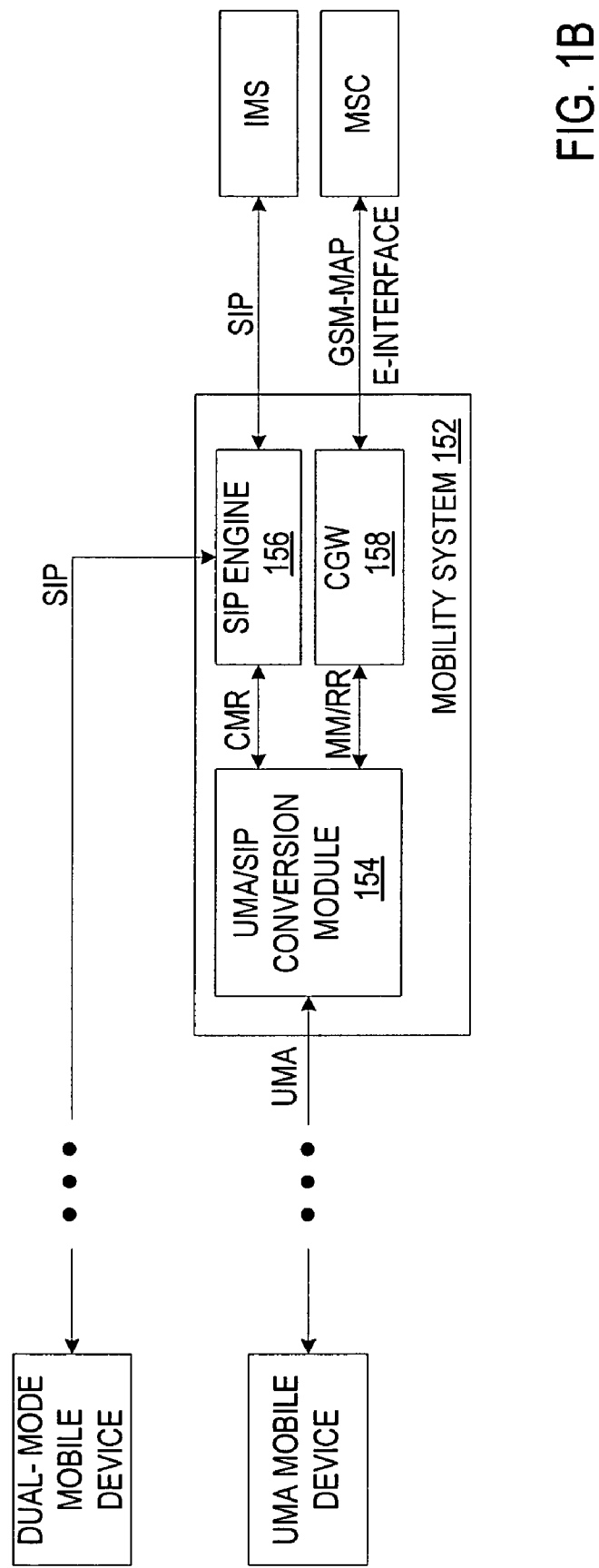
FIG. 1B is a block diagram of one embodiment of a mobility system.

FIG. 1B is a block diagram of one embodiment of a mobility system 152. The mobility system 152 includes a UMA/SIP conversion module (also referred to as a conversion module) 154, a SIP engine 156, and a cellular gateway (CGW) 158.

The SIP engine 156 is responsible for controlling media sessions for mobile devices. In one embodiment, the SIP engine 156 performs SIP-based registration and authentication for mobile devices, and SIP-based session setup, termination and teardown. The SIP engine 156 operates using SIP messages of dual-mode mobile devices, as well as SIP messages received from the UMA/SIP conversion module 154.

The functionality of the SIP engine 156 may be similar to that of Connection Management (CM) performed by a GSM MSC. However, the SIP engine 156 does not have the inherent complexities associated with GSM CM. Contrary to the GSM CM, which performs soft switch functionality such as PSTN call processing and service delivery functions, the SIP engine 156 leverages existing Soft-switch element, which is part of the IMS 130, for performing the above functions.

The CGW 158 is responsible for providing an interface to the cellular network. The CGW 158 facilitates seamless handoffs and performs location updates towards the HLR. In one embodiment, the CGW 158 provides signaling interfaces towards the MSC in GSM mobile networks, and performs similar functions as GSM mobility management (MM) related to location updates and handoff signaling. The CGW 158 may also perform a subset of the GSM radio resource management (RR) functions related to handoff trigger detection and handoff decision making. In one embodiment, the CGW 158 is responsible for detecting handoff triggers, interfacing with the MSC for inter-MSC handoff execution, and interfacing with the HLR for location updates. In one embodiment, signaling functions related to inter-MSC handoff execution are carried out via GSM-MAP (SS7 TCAP). For location update related signaling, the CGW 158 may use the GSM-MAP protocol to interface with an SS7 TCAP based HLR.

The UMA/SIP conversion module 154 is responsible for receiving UMA messages from UMA mobile devices, transforming each UMA message into a format facilitating inter-working between UMA and SIP signaling, and transferring the transformed message to the SIP engine 156 or the CGW 158. In one embodiment, the UMA/SIP conversion module 154 first determines the type of a UMA message (e.g., based on data in the message header) and then performs a conversion according to the type. In particular, in one embodiment, if the UMA/SIP conversion module 154 determines that the UMA message relates to connection management (CM) or RTP bearer setup, it converts the UMA message into a SIP message, and transfers the SIP message to the SIP engine 156. Alternatively, if the UMA/SIP conversion module 154 determines that the UMA message relates to mobility management (MM) or radio resource management (RR), it parses the UMA message, extracts relevant GSM message content and forwards it to the CGW 158 for processing. In one embodiment, the CGW 158 composes this content into the GSM-MAP format and sends it to the MSC using the E-Interface.

In addition, the UMA/SIP conversion module 154 is also responsible for sending downlink signaling messages in the UMA format towards the mobile devices. In particular, in one embodiment, the UMA/SIP conversion module 154 converts SIP call-setup and bearer setup related messages into the UMA format and forwards them towards the mobile devices. When the UMA/SIP conversion module 154 receives MM and RR related content from the CGW 158, it composes them into UMA messages and passes them to the mobile devices.

Figure 2:
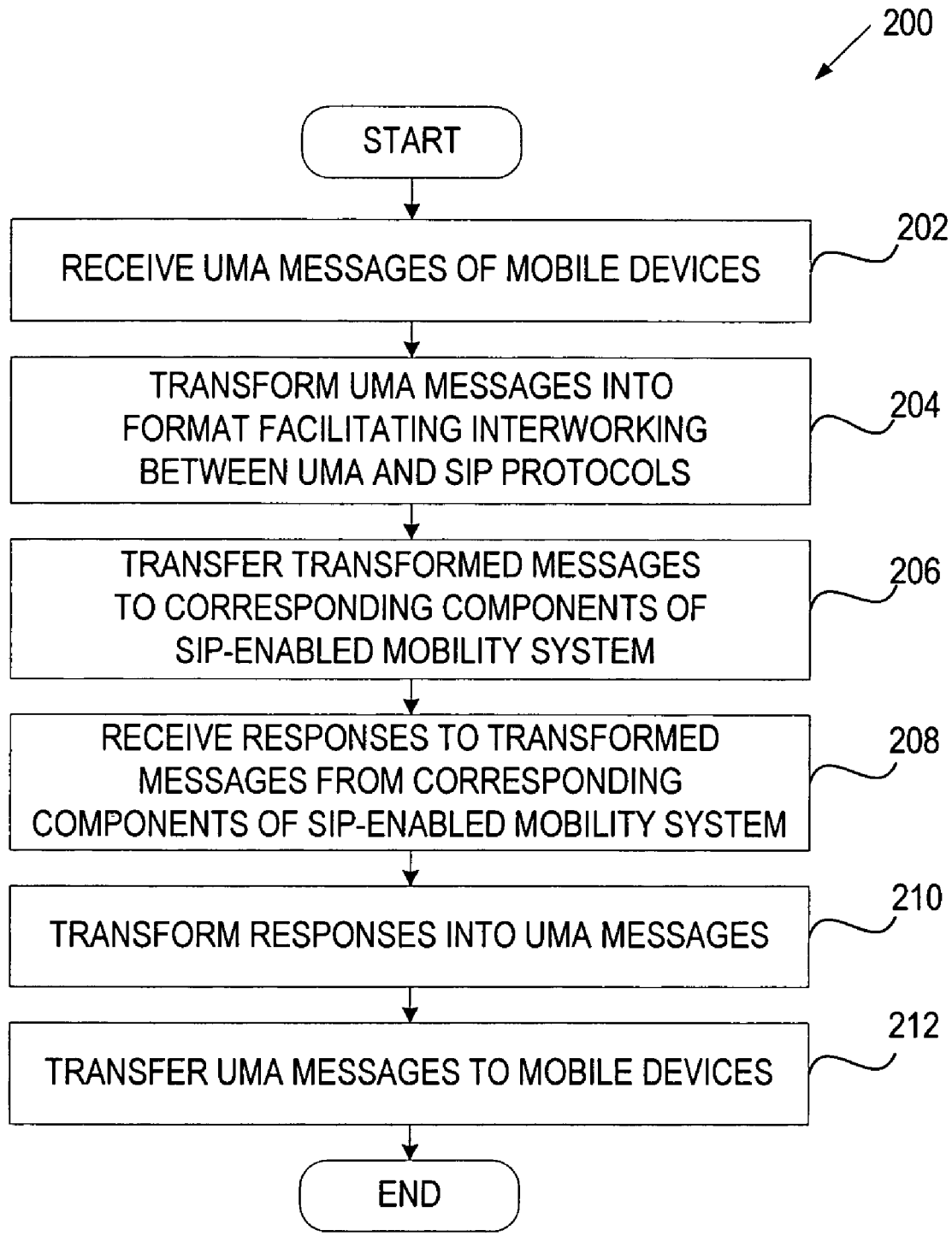
FIG. 2 is a flow diagram of one embodiment of a process for facilitating inter-working between UMA and SIP signaling.

FIG. 2 is a flow diagram of one embodiment of a process 200 for facilitating inter-working between UMA and SIP signaling. The process may be performed by processing logic that may comprise hardware (e.g., circuitry, dedicated logic, programmable logic, microcode, etc.), software (such as run on a general purpose computer system or a dedicated machine), or a combination of both. In one embodiment, the process 200 is performed by a mobility system 112 of FIG. 1A.

Referring to FIG. 2, processing logic begins with receiving UMA messages of mobile devices (block 202).

At block 204, processing logic transforms each UMA message into a format facilitating inter-working between UMA and SIP protocols. This format may be a SIP format or some other format enabling SIP-based call control for UMA mobile devices. One embodiment of a process for transforming UMA messages is discussed in more detail below in conjunction with FIG. 3.

At block 206, processing logic transfers the transformed messages to corresponding components of a SIP-based mobility system. For example, the SIP-based mobility system may be the mobility system 152, and the corresponding components may be the SIP engine 156 and the CGW 158.

At block 208, processing logic receives responses to the transformed messages from the corresponding components of the SIP-based mobility system.

At block 210, processing logic transforms the responses into UMA messages. One embodiment of a process for transforming responses into UMA messages is discussed in more detail below in conjunction with FIG. 4.

At block 212, processing logic transfers the resulting UMA messages towards the mobile devices.

Figure 3:
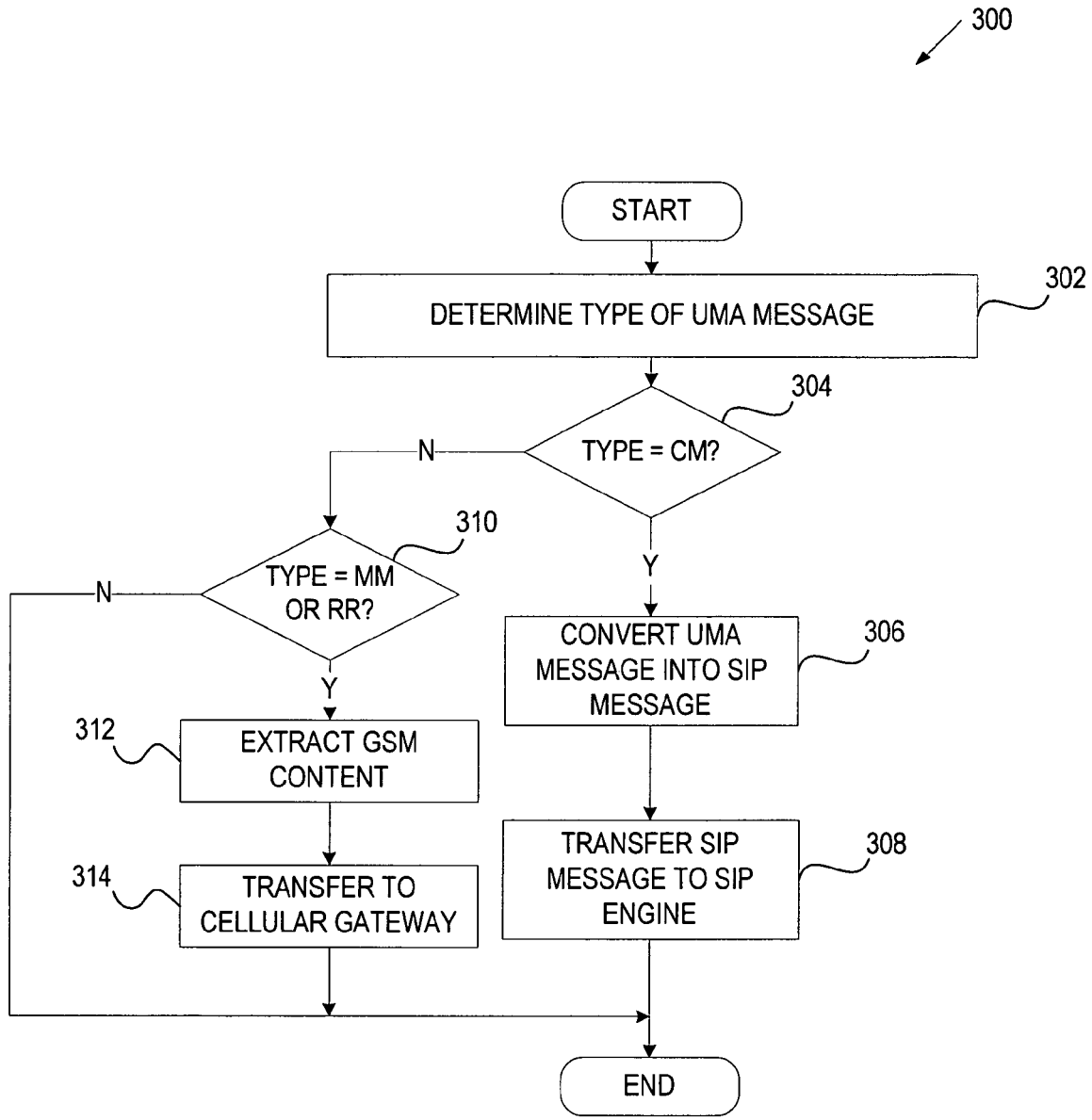
FIG. 3 is a flow diagram of one embodiment of a process for converting uplink UMA messages.

FIG. 3 is a flow diagram of one embodiment of a process 300 for converting UMA messages of mobile devices. The process may be performed by processing logic that may comprise hardware (e.g., circuitry, dedicated logic, programmable logic, microcode, etc.), software (such as run on a general purpose computer system or a dedicated machine), or a combination of both. In one embodiment, the process 300 is performed by a UMA/SIP conversion module 154 of FIG. 1B.

Referring to FIG. 3, processing logic begins with determining the type of a UMA message sent by a mobile device (block 302). In one embodiment, the type of the UMA message is determined based on a designated field in the message header. The type may indicate, for example, that the UMA message relates to connection management call-setup (CM), RTP bearer setup (RTP setup), mobility management (MM), or radio resource management (RR).

If the messages type is CM or RTP setup (block 304), processing logic coverts the UMA message into a SIP message (block 306) and transfers the SIP message to a SIP engine of the mobility system. In one embodiment, processing logic performs conversion of relevant GSM content of the UMA message based on Q.931. In particular, processing logic may extract the GSM CM content from the UMA message and map this content to the SIP format.

Alternatively, if the message type is MM or RR (block 310), processing logic parses the UMA message to extract relevant GSM content (block 312), and then transfers the extracted content to a CGW of the mobility system (block 314).

Figure 4:
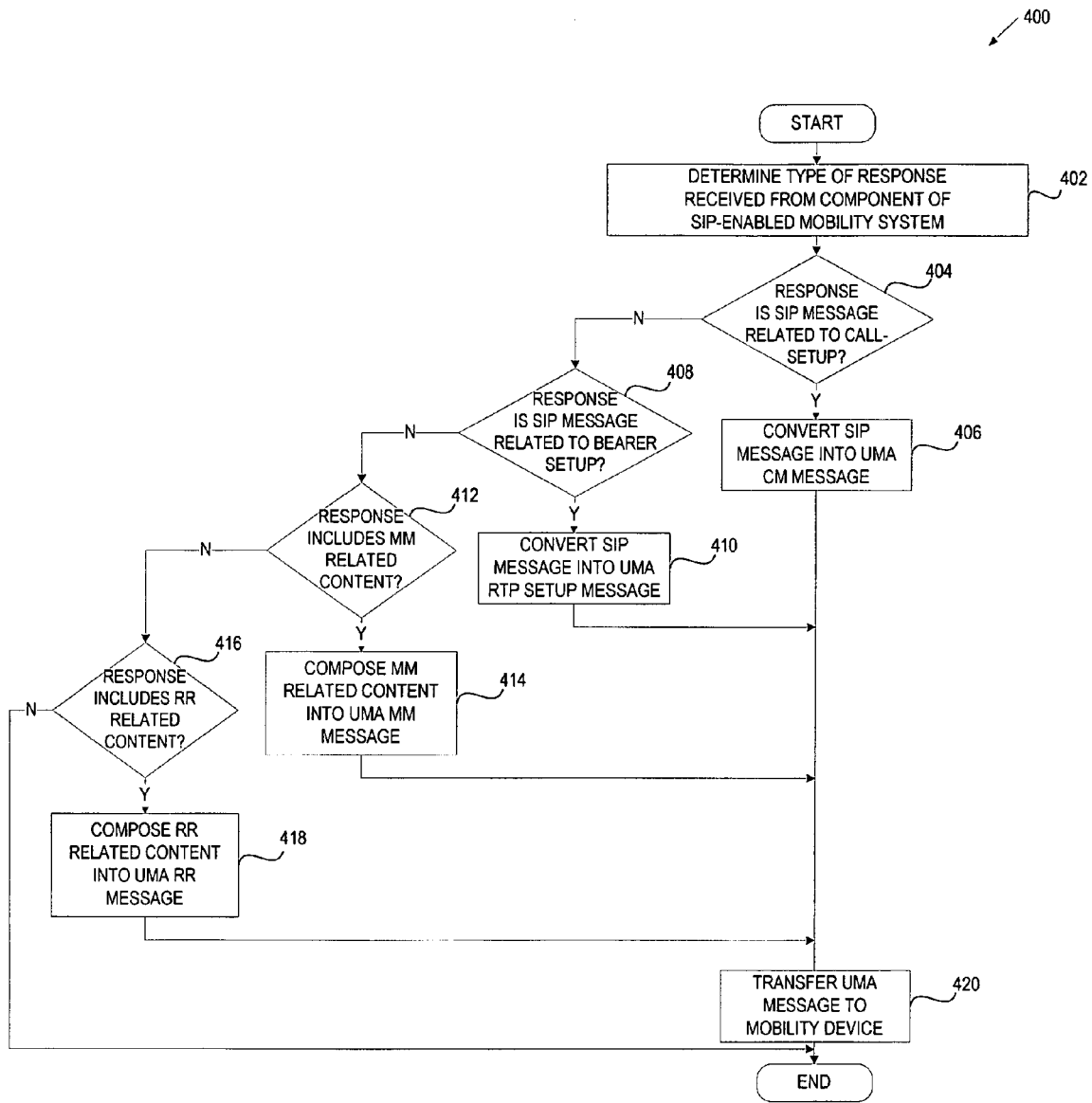
FIG. 4 is a flow diagram of one embodiment of a process for providing downlink UMA messages to mobile device.

FIG. 4 is a flow diagram of one embodiment of a process 400 for providing UMA messages to mobile devices. The process may be performed by processing logic that may comprise hardware (e.g., circuitry, dedicated logic, programmable logic, microcode, etc.), software (such as run on a general purpose computer system or a dedicated machine), or a combination of both. In one embodiment, the process 400 is performed by a UMA/SIP conversion module 154 of FIG. 1B.

Referring to FIG. 4, processing logic begins with determining the type of a message received from the SIP engine or the CGW (block 402). The received message may be a response to a converted message as discussed above with respect to FIG. 3, or some other message created by the SIP engine or the CGW.

If the received message came from the SIP engine and is a SIP message related to call setup (block 404), processing logic converts this SIP message received from the SIP engine into GSM CM and then the UMA message format (block 406), and sends it to the mobile device (block 406).

Alternatively, if the received message came from the SIP engine and is a SIP message related to bearer setup (block 408), processing logic converts the message and associated SDP (Session Description Protocol) parameters into a UMA RTP setup message (block 410), and sends it to the mobile device (block 406).

If the received message came from the CGW and is related to MM (block 412), processing logic composes the MM related content into the UMA format (block 414), and sends the resulting UMA MM message to the mobile device (block 406).

If the received message came from the CGW and is related to RR (block 416), processing logic composes the RR related content into the UMA format (block 418), and sends the resulting UMA RR message to the mobile device (block 406).

Embodiments described herein support various UMA call flows, including UMA discovery and registration call flows defined in the UMA Architecture Specification (e.g., as illustrated in FIG. 9.2.1.1 of UMA Architecture, Stage 2, R1.0.1, Oct. 8, 2004). UMA messages associated with the UMA discovery and registration call flows may provide such parameters as a cell identifier (Cell ID), a location area indicator (LAI), international mobile subscriber identity (IMSI), IP address of the UNC referred to as EPSec SEG IP address), etc. These messages may include, for example, URR Discovery Request (Cell ID/LAI/IMSI), URR Register Request (Cell ID/LAI/IMSI), URR Discovery Accept (IPSec SEG IP address/Default IP Address of Mobility System), URR Discovery Reject (Cause), URR Register Redirect (EPSec SEG IP address IP Address of Mobility System), and URR Register Accept.

Upon receipt of the URR Register Request message, relevant GSM parameters such as IMSI/Cell ID/LAI are derived from the message and passed on to the CGW for processing. In response, the mobility system may perform such functions related to registration as location update towards the HLR and SIP registration process. For example, the mobility system may provide mapping to SIP-based registration call flows and associated SIP messages to complete SIP registration/de-registration processes, and perform location updates towards the HLR as appropriate.

In addition, the mobility system may support UMA de-registration and registration update processes towards the UMA mobile devices. Relevant UMA messages may include, for example, URR De-register, URR Register Update Uplink (from handset), URR Register Update Downlink, and URR Register Redirect.

In one embodiment, receipt of the URR De-Register message by the mobility system triggers a SIP De-Registration process. The mobility system provides mapping between the URR De-Register message to a SIP Register message. In addition, in one embodiment, the mobility system supports the URR Register Accept message (e.g., analogous to the SIP 200 OK message containing GSM information) that includes, for example, cell description including BCCH/ARFCN/PLMN color code/BSIC, location area ID consisting of mobile country code, mobile network code, and location area code corresponding to the GAN cell, cell ID identifying the cell within the location area, and an application level Keep Alive timer value.

In one embodiment, during the registration process, the mobile system passes information related to Cell Broadcast Services to the mobile device in URR Cell Broadcast Info message format, and accepts periodic incoming URR Keep Alive message flows. A URR message provided by a UMA mobile device may also contain the ID of the serving AP. In one embodiment, the mobility system stores the AP ID to enable location-based services.

UMA call flows supported by the mobility system may also include the Mobile Originated Speech call flow defined in the UMA Architecture Specification (e.g., as shown in FIG. 9.8.1 of UMA Architecture, Stage 2, R1.0.1, Oct. 8, 2004). In particular, in one embodiment, the mobility system maps GSM CM messages (DTAP) in UMA format into SIP call control signaling messages. In one embodiment, the mapping consists of inter-working between Q.931 and SIP. Once the UMA call setup message is mapped to SIP, SIP setup processing procedures for call origination takes over. In one embodiment, the mobility system receives GSM RR parameters from the CGW and formats them into SIP messages.

In one embodiment, upon receiving the URR DT (CM Service Request) message, the mobility system issues an authentication challenge as specified in the UMA Mobile Originated Speech call flow, passes GSM ciphering information down to the mobile device in URR Ciphering Mode Command message format, and provides support for the response from the mobile device in URR Ciphering Mode Complete message format.

In one embodiment, upon receiving the URR DT (Setup) message, the mobility system maps the message to SIP INVITE, and then formulates and sends the URR DT (Call Proceeding) message to the UMA mobile device.

In one embodiment, within the same call-flow, upon receiving SIP 200 OK message, the mobility system maps SIP SDP information into URR Activate Channel message format, accepts URR Activate Channel ACK message from the UMA mobile device, and sends SIP ACK message to the Soft-switch to complete the RTP session setup.

Additional UMA messages supported by the mobility system for this call-flow may include, for example, URR Activate Channel Complete, URR DT (Alerting), URR DT (Connect), and URR DT (Connect Ack).

UMA call flows supported by the mobility system may also include the Mobile Terminated Speech call flow defined in the UMA Architecture Specification (e.g., in FIG. 9.9.1 of UMA Architecture, Stage 2, R1.0.1, Oct. 8, 2004). In particular, in one embodiment, upon receiving an incoming SIP INVITE message, the mobility system sends the URR Paging Request message to the UMA mobile device, accepts URR Paging Response from the UMA mobile device, performs authentication challenge, passes GSM ciphering information down to the mobile device in URR Ciphering Mode Command message format, receives a response from the mobile device in URR Ciphering Mode Complete message format, sends URR Downlink DT (Setup) message to the mobile device, and accepts URR Uplink DT (Call Confirmed) message from the mobile device.

In one embodiment, upon receiving the URR Uplink DT (Call Confirmed) message, the mobility system maps SIP INVITE/SDP content into URR Activate Channel message format, accepts URR Activate Channel ACK message from the UMA mobile device, maps its content into a SIP 200 OK message, and sends the SIP 200 OK message to the Soft-switch to complete the RTP session setup.

Additional UMA messages supported by the mobility system for this call-flow may include, for example, URR DT (Alerting), URR DT (Connect), URR DT (Connect Ack) sent upon receipt of SIP ACK from the Soft-switch, etc.

UMA call flows supported by the mobility system may further include the Hand-Out call flow defined in the UMA Architecture Specification (e.g., as shown in FIG. 9.11.1 of UMA Architecture, Stage 2, R1.0.1, Oct. 8, 2004). In particular, in one embodiment, upon receiving the URR Handover Required message, the mobility system extracts the body of the GSM Handover Required message and passes it on to the CGW for processing. The CGW then performs CGW procedures over the E-Interface with the target MSC take over at this point for executing the Hand-Out. In addition, at this point a SIP Engine procedures for setting up the new call leg via the Soft-switch may also take place.

In one embodiment, once the CGW receives Handover Command information from the target MSC, the mobility system maps the content into the URR Handover Command message format and sends to the UMA mobile device. Further, once the mobility system sends the SIP ACK message to the Soft-switch, indicating the completion of new bearer path setup, it also sends the URR Release message to the UMA mobile device, and accepts URR Release Complete message from the mobile device.

In one embodiment, upon receiving the URR De-register message from the mobile device, the mobility system performs a SIP De-registration procedure.

An additional UMA message supported by the mobility system for this call-flow may include, for example, the URR Uplink Quality Indication message.

UMA call flows supported by the mobility system may further include the Hand-In call flow defined in the UMA Architecture Specification (e.g., as illustrated in FIG. 9.10.1 of UMA Architecture, Stage 2, R1.0.1, Oct. 8, 2004). In particular, the mobility system provides support for the UMAN registration procedure and triggers a SIP-based registration as described before. UMAN registration is the first step for the Hand-In call flow. In particular, in on embodiment, once the UMA mobile device has initiated Hand-In via UMAN registration procedure, the CGW executes GSM-MAP exchange with the current serving GSM MSC to set up the Hand-In. Upon receipt of the URR Handover Access message, the mobility system may trigger RTP session setup procedure with the Soft-switch and the UMA mobile device. In parallel, the SIP Engine may also receive a SIP INVITE from the Soft-switch to set up the new call leg for the Hand-In.

As discussed before, the RTP session setup procedure may include mapping received SIP INVITE/SDP content into URR Activate Channel message format, accepting URR Activate Channel ACK message from the UMA mobile device and mapping its content into a SIP 200 OK message, and sending the SIP 200 OK message to the Soft-switch to complete the RTP session setup. At this point, the mobility system may receive the URR Handover Complete message from the UMA mobile device, and then trigger the CGW to complete the GSM-MAP procedure with the MSC.

An Exemplary Computer System

Figure 5:
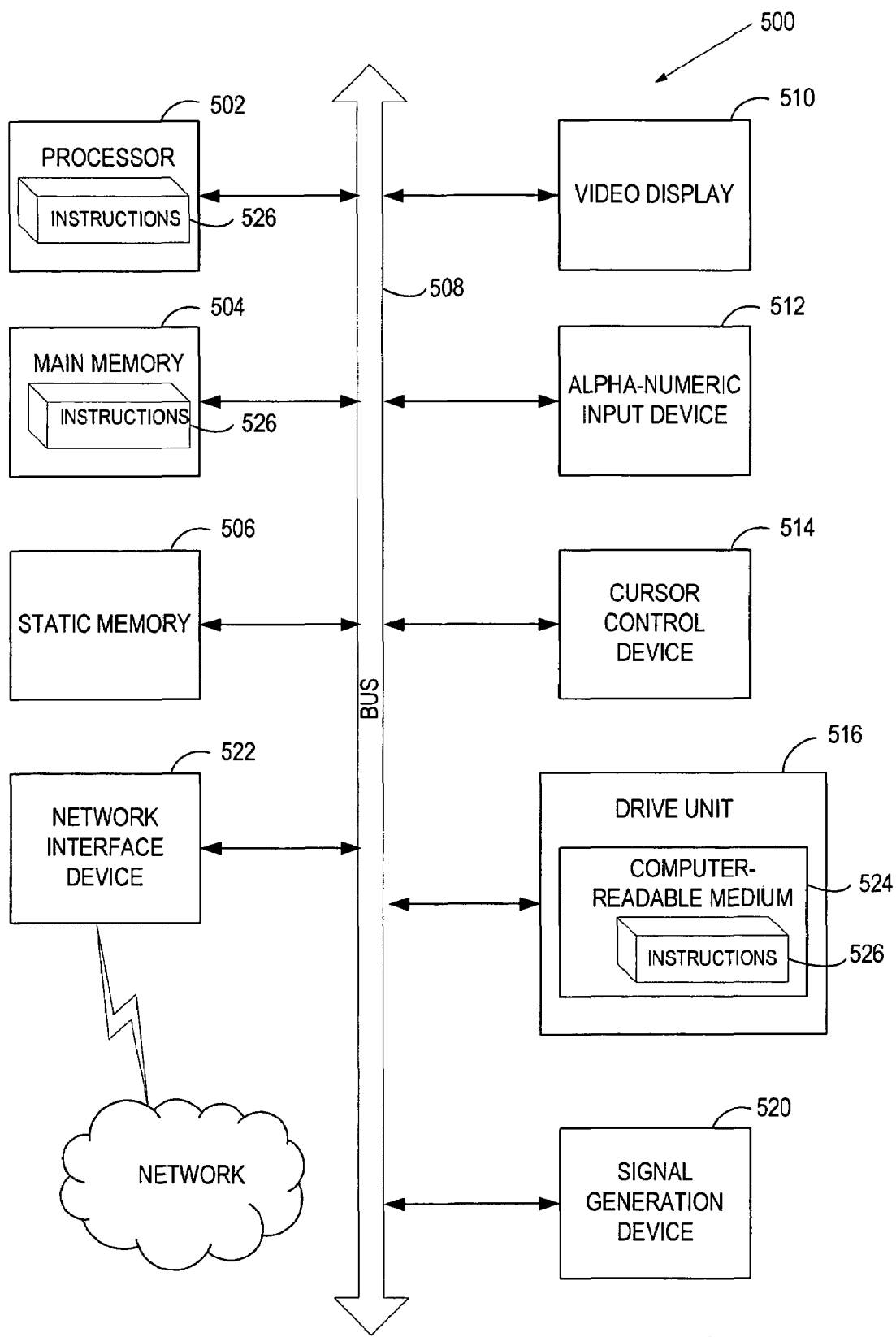
FIG. 5 is a block diagram of an exemplary computer system.

FIG. 5 is a block diagram of an exemplary computer system 500 that may be used to perform one or more of the operations described herein. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 500 includes a processor 502, a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alpha-numeric input device 512 (e.g., a keyboard), a cursor control device 514 (e.g., a mouse), a disk drive unit 516, a signal generation device 520 (e.g., a speaker) and a network interface device 522.

The disk drive unit 516 includes a computer-readable medium 524 on which is stored a set of instructions (i.e., software) 526 embodying any one, or all, of the methodologies described above. The software 526 is also shown to reside, completely or at least partially, within the main memory 504 and/or within the processor 502. The software 526 may further be transmitted or received via the network interface device 522. For the purposes of this specification, the term "computer-readable medium" shall be taken to include any medium that is capable of storing or encoding a sequence of instructions for execution by the computer and that cause the computer to perform any one of the methodologies of the present invention. The term "computer-readable medium" shall accordingly be taken to included, but not be limited to, solid-state memories, and optical and magnetic disks.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A computer-implemented method comprising:
receiving a plurality of unlicensed mobile access (UMA) messages of a plurality of mobile devices; and
transforming each of the plurality of UMA messages into a different format, facilitating inter-working between a UMA protocol and a session initiation protocol (SIP) for the plurality of mobile devices, depending upon a type of a corresponding UMA message,
wherein transforming each of the plurality of UMA messages comprises:
if the type relates to a mobility management (MM) or a radio resource management (RR), extracting GSM content from the corresponding UMA message and composing the extracted GSM content into a GSM-MAP format; and
if the type relates to a connection management (CM) or a real-time transport protocol (RTP) bearer setup, converting the corresponding UMA message into a corresponding SIP message.

2. The method of claim 1 further comprising:
transferring the corresponding SIP message to a SIP engine.

3. The method of claim 1 further comprising:
transferring the extracted GSM content to a cellular gateway.

4. The method of claim 1 further comprising:
receiving a message in response to a corresponding one of the plurality of UMA messages;
transforming the received message into a UMA message; and
transferring the transformed UMA message to one of the plurality of mobile devices.

5. The method of claim 4 wherein transforming the received message into a UMA message comprises:
determining the type of the received message; and if the received message is a SIP message related to a call-setup, converting the SIP message into a UMA connection management (CM) message.

6. The method of claim 5 further comprising:
if the received message is a SIP message related to a bearer setup, converting the SIP message into a UMA real-time transport protocol (RTP) setup message.

7. The method of claim 5 further comprising:
if the received message relates to a mobility management (MM), compose MM related content into a UMA MM message.

8. The method of claim 5 further comprising:
if the received message relates to a radio resource management (RR), compose RR related content into a UMA RR message.

9. The method of claim 1 wherein the plurality of UMA messages comprises messages selected from the group consisting of discovery messages, registration messages, de-registration messages, call origination messages, call termination messages, and handover messages.

10. An apparatus comprising:
means for receiving a plurality of unlicensed mobile access (UMA) messages of a plurality of mobile devices; and
means for transforming each of the plurality of UMA messages into a different format, facilitating inter-working between a UMA protocol and a session initiation protocol (SW) for the plurality of mobile devices, depending upon a type of a corresponding UMA message,
wherein means for transforming each of the plurality of UMA messages comprises:
means for extracting GSM content from the corresponding UMA message and composing the extracted GSM content into a GSM-MAP format, if the type relates to a mobility management (MM) or a radio resource management (RR); and
means for converting the, corresponding UMA message into a corresponding SIP message, if the type relates to a connection management (CM) or a real-time transport protocol (RTP) bearer setup.

11. A system comprising:
a conversion module to receive a plurality of unlicensed mobile access (UMA) messages of a plurality of mobile devices, and to transform each of the plurality of UMA messages into a different format, facilitating inter-working between a UMA protocol and a session initiation protocol (SIP) for the plurality of mobile devices, depending upon a type of a corresponding UMA message,
wherein transforming each of the plurality of UMA messages comprises:
if the type relates to a mobility management (MM) or a radio resource management (RR), extracting GSM content from the corresponding UMA message and composing the extracted GSM content into a GSM-MAP format; and
if the type relates to a connection management (CM) or a real-time transport protocol (RTP) bearer setup, converting the corresponding UMA message into a corresponding SIP message.

12. The system of claim 11 further comprising:
a SIP engine to receive the corresponding SIP message.

13. The system of claim 11 further comprising:
a cellular gateway to receive the extracted GSM content.

14. A computer readable medium comprising executable instructions which when executed on a processing system cause said processing system to perform a method comprising:
receiving a plurality of unlicensed mobile access (UMA) messages of a plurality of mobile devices; and
transforming each of the plurality of UMA messages into a different format, facilitating inter-working between a UMA protocol and a session initiation protocol (SIP) for the plurality of mobile devices, depending upon a type of a corresponding UMA message,
wherein transforming each of the plurality of UMA messages comprises:
if the type relates to a mobility management (MM) or a radio resource management (RR), extracting GSM content from the corresponding UMA message and composing the extracted GSM content into a GSM-MAP format; and
if the type relates to a connection management (CM) or a real-time transport protocol (RTP) bearer setup, converting the corresponding UMA message into a corresponding SIP message.

* * * * *